(12) United States Patent
Burka et al.

(10) Patent No.: US 8,042,103 B2
(45) Date of Patent: Oct. 18, 2011

(54) PRE-TRANSLATED FILES USED IN A VIRTUAL MACHINE

(75) Inventors: Peter Wiebe Burka, Ottawa (CA); Ronald Servant, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1472 days.

(21) Appl. No.: 11/289,028

(22) Filed: Nov. 29, 2005

(65) Prior Publication Data
US 2007/0169069 A1   Jul. 19, 2007

(51) Int. Cl.
*G06F 9/45* (2006.01)
(52) U.S. Cl. ......... 717/166; 717/140; 717/147; 717/148
(58) Field of Classification Search .................. 717/148, 717/145, 166, 170, 158; 711/170; 707/204, 707/104.1, 100
See application file for complete search history.

(56) References Cited

U.S. PATENT DOCUMENTS

| | | | | |
|---|---|---|---|---|
| 5,815,718 | A * | 9/1998 | Tock | 717/166 |
| 5,920,720 | A * | 7/1999 | Toutonghi et al. | 717/148 |
| 5,923,878 | A * | 7/1999 | Marsland | 717/139 |
| 6,026,237 | A * | 2/2000 | Berry et al. | 717/130 |
| 6,202,208 | B1 * | 3/2001 | Holiday, Jr. | 717/166 |
| 6,272,674 | B1 * | 8/2001 | Holiday, Jr. | 717/174 |
| 6,289,506 | B1 * | 9/2001 | Kwong et al. | 717/148 |
| 6,295,643 | B1 * | 9/2001 | Brown et al. | 717/148 |
| 6,332,218 | B1 * | 12/2001 | Walker et al. | 717/166 |
| 6,360,358 | B1 * | 3/2002 | Elsbree et al. | 717/120 |
| 6,470,494 | B1 * | 10/2002 | Chan et al. | 717/166 |
| 6,507,946 | B2 * | 1/2003 | Alexander et al. | 717/145 |
| 6,542,908 | B1 * | 4/2003 | Ims | 707/204 |
| 6,571,388 | B1 * | 5/2003 | Venkatraman et al. | 717/166 |
| 6,634,022 | B1 * | 10/2003 | Leermakers | 717/158 |
| 6,654,954 | B1 * | 11/2003 | Hicks | 717/162 |
| 6,851,109 | B1 * | 2/2005 | Alexander et al. | 717/148 |
| 7,051,324 | B2 * | 5/2006 | Gissel et al. | 717/166 |
| 7,246,346 | B2 * | 7/2007 | Demsey et al. | 717/147 |
| 7,296,265 | B1 * | 11/2007 | Krishnan et al. | 717/166 |

(Continued)

OTHER PUBLICATIONS

"Proxy Compilation of Dynamically Loaded Java Classes with MoJo", Matt Newsome et al., Jul. 2002, pp. 1-9, <http://delivery.acm.org/10.1145/520000/513863/p204-newsome.pdf?ip=151.207.242.4&CFID=25773540&CFTOKEN=78205336&_acm_=1307460045_5b40be6d838affcac835eb5ed863425f>.*

(Continued)

*Primary Examiner* — Thuy Dao
*Assistant Examiner* — Ziaul A. Chowdhury
(74) *Attorney, Agent, or Firm* — Yee & Associates, P.C.; Libby Z. Toub

(57) ABSTRACT

A method and apparatus for speeding the startup of applications by making available a pre-translated class file to the class loaders. The Java virtual machine (JVM) starts faster if application class loaders can use the pre-translated class files or internal representations instead of fetching classes from Java archive files or system directories. JVM understands java executable format and can start faster by using them without the user application class loaders having to know the complexities of executable files. The Java archive file format is modified to allow the pre-translated class files to be stored in the Java archive file such that the class loaders are able to process the modified Java archive file without requiring any change to the class loader.

16 Claims, 5 Drawing Sheets

U.S. PATENT DOCUMENTS

| | | | |
|---|---|---|---|
| 7,475,214 B2* | 1/2009 | Hwang | 711/170 |
| 7,529,771 B2* | 5/2009 | Watanabe et al. | 707/104.1 |
| 2002/0144243 A1* | 10/2002 | Alexander, III et al. | 717/140 |
| 2005/0108259 A1* | 5/2005 | Watanabe et al. | 707/100 |
| 2007/0169069 A1* | 7/2007 | Burka et al. | 717/166 |

OTHER PUBLICATIONS

"Programming Languages for Mobile Code", Tommy Thorn, Sep. 1997, pp. 1-27, <http://delivery.acm.org/10.1145/270000/262010/p213-thorn.pdf?ip=151.207.242.4&CFID=25773540&CFTOKEN=78205336&__acm__=1307461036__f3bf38e5f4b77ce92a7eedaf43514fbb>.*

"Mobile Code Security by Java Bytecode Instrumentation", Ajay Chander et al., 2001, pp. 1-14, <http://ieeexplore.ieee.org/stamp/stamp.jsp?tp=&arnumber=932157>.*

"Runtime Techniques and Interprocedural Analysis in Java Virtual Machines", Feng Qian, 2005, pp. 1-155, <http://scholar.google.com/scholar?start=110&q=java+virtual+machine+class+loader+proxy+file+bytecod+interpreter&hl=en&as_sdt=1,47>.*

* cited by examiner

PRE-TRANSLATED FILES USED IN A VIRTUAL MACHINE

BACKGROUND OF THE INVENTION

1. Field of the Invention

The present invention relates generally to an improved data processing system, and in particular to a method and apparatus for executing programming languages. Still more particularly, the present invention relates to a computer implemented method, apparatus, and computer usable program code for processing files in a virtual machine.

2. Description of the Related Art

Computer developers have made a number of different computer microprocessors suited to particular sorts of problems. Machine instructions, are, in a sense, the language for a particular processing unit architecture. Some microprocessors execute complex instruction sets, while others execute reduced instruction sets.

The instructions are usually difficult for a human being to read and understand, let alone write as a program. Consequently, higher-order languages have been conceived that mimic aspects of human languages such as English. Such languages, including Java™, permit rapid development of useful programs, though the resultant code is not immediately executable on a microprocessor. Java is a trademark of Sun Microsystems, Incorporated. In order for such higher-order codes or programs to be used by a microprocessor, the programs must be interpreted and compiled into a machine language that is suited for the particular processor architecture.

Java programs are architecture independent in the sense that all microprocessors that have a Java Virtual Machine (JVM) are able to compile such programs to the machine language of the microprocessor. The compiling step may introduce a delay in executing a program, however, this is the cost of making a program independent of the architecture.

Developers have wanted a more rapid way to execute Java programs. Java programs are often packaged as a bundle of class files. Each class file provides instructions to perform a particular function of a program. However, in order to perform each function, as mentioned above, a Java virtual machine (JVM) must compile the function into machine instructions and then execute the compiled machine instructions. It would be advantageous to have such compiled machine instructions available at the outset of executing a program. Compiled machine instructions are among pre-translated versions of the high-level language. Consequently, pre-translated files might be faster to perform if such compiled machine instructions were accessible to a Java virtual machine without compilation.

SUMMARY OF THE INVENTION

The aspects of the present invention provide a computer implemented method and computer program product for processing files in a virtual machine. A virtual machine receives a file loaded by a class loader for the virtual machine. The virtual machine determines if the file contains a distinctive pattern. The distinctive pattern indicates a set of values and a set of modified class data. If it is determined that the file contains the distinctive pattern, the virtual machine obtains access to the set of modified class data for an executable class resource.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
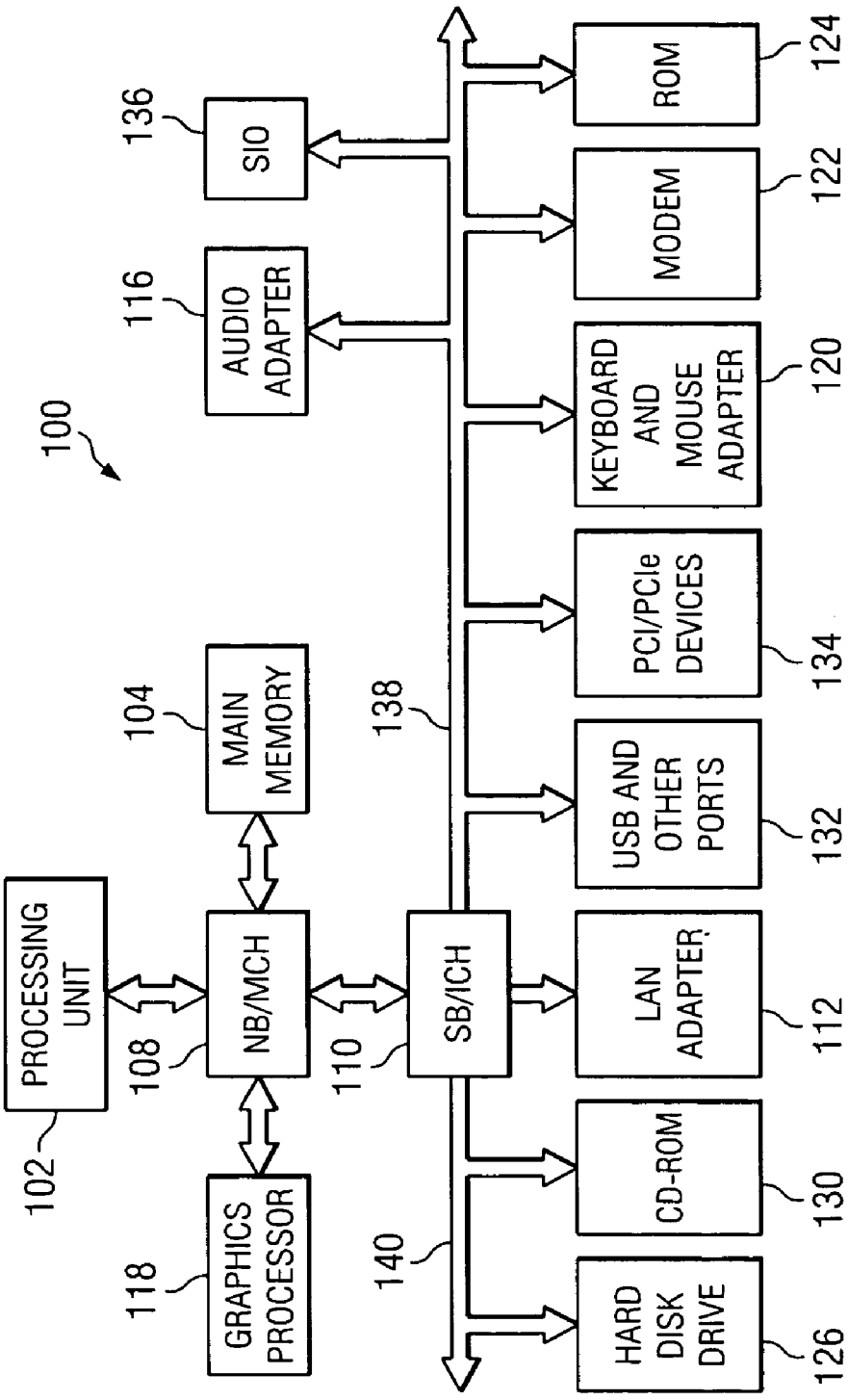
FIG. 1 shows a block diagram of a data processing system in accordance with an illustrative embodiment of the present invention.

With reference now to FIG. 1, a block diagram of a data processing system is shown in which embodiments of the present invention may be implemented. In the depicted example, data processing system 100 employs a hub architecture including north bridge and memory controller hub (MCH) 108 and south bridge and input/output (I/O) controller hub (ICH) 110. Processing unit 102, main memory 104, and graphics processor 118 connect to north bridge and memory controller hub 108. Graphics processor 118 may connect to north bridge and memory controller hub 108 through an accelerated graphics port (AGP).

In the depicted example, local area network (LAN) adapter 112, audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 110 through bus 138. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

Hard disk drive 126 and CD-ROM drive 130 connect to south bridge and I/O controller hub 110 through bus 140. Hard disk drive 126 and CD-ROM drive 130 may use, for example, an integrated drive electronics (IDE) or serial advanced technology attachment (SATA) interface. Super I/O (SIO) device 136 may connect to south bridge and I/O controller hub 110.

Figure 2:
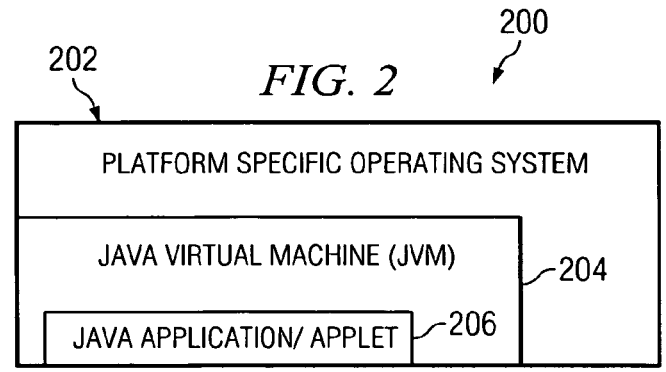
FIG. 2 shows a block diagram of software components in accordance with an illustrative embodiment of the present invention.

With reference now to FIG. 2, a block diagram illustrates the relationship of software components operating within a computer system that may implement the present invention. Java-based system 200 contains platform specific operating system 202 that provides hardware and system support to software executing on a specific hardware platform. Java virtual machine (JVM) 204 is one software application that may execute in conjunction with the operating system. Java is a trademark of Sun Microsystems, Incorporated. Java virtual machine 204 provides a Java run-time environment with the ability to execute Java application or applet 206, which is a program, servlet, or software component developers may write in the Java programming language. Java virtual machine 204 may operate in computer systems similar to data processing system 100 of FIG. 1. Nevertheless, developers of a Java virtual machine in accordance with an illustrative embodiment of the present invention may implement Java virtual machine 204 on a so-called Java chip, Java-on-silicon, or Java processor with an embedded picoJava core.

At the center of a Java run-time environment is the Java virtual machine, which supports all aspects of Java's environment, including Java's architecture, security features, mobility across networks, and platform independence.

The Java virtual machine is a virtual computer, that is, a computer that developers specify in the abstract. The specification of the Java virtual machine defines certain features that every Java virtual machine implements, with some range of design choices that may depend upon the platform on which the developers design the Java virtual machine to execute. For example, all Java virtual machines execute Java bytecodes and may use a range of techniques to execute the instructions represented by the bytecodes. A developer may implement the Java virtual machine completely in software or partially in hardware. This flexibility allows the developers to design different Java virtual machines for systems ranging from mainframe computers to PDAs and other micro devices.

The Java virtual machine may also be the name of a virtual computer component that actually executes Java programs. The Java virtual machine and not the central processor directly runs Java programs. For example, the processor is processing unit 102 of FIG. 1. The Java virtual machine allows Java programs to execute on a different platform as opposed to only the one platform for which the developer compiled the code. Developers may compile Java programs for the Java virtual machine. In this manner, Java is able to support applications for many types of data processing systems, which may contain a variety of central processing units and operating systems architectures. To enable a Java application to execute on different types of data processing systems, a compiler typically generates an architecture-neutral file format—the compiled code can execute on many processors, given the presence of the Java run-time system. The Java compiler generates bytecode instructions that are nonspecific to a particular computer architecture. A bytecode is a machine independent code that the Java compiler generates and the Java Interpreter executes. A Java interpreter is part of the Java virtual machine that alternately decodes and interprets a bytecode or bytecodes. The compiler generates these bytecode instructions so that they are easy for the interpreter on any computer to interpret and translate on the fly into native machine code. A just-in-time compiler may translate the bytecodes into native code in a process sometimes called just-in-time compiling (jitting) a method. Embodiments of the present invention may skip steps that are normally performed just prior to just-in-time compiling. Embodiments of the present inventions skip when the embodiments discover a pre-translated file.

One type of software-based execution engine is a just-in-time compiler. With this type of execution, the compiler compiles the bytecodes of a method to native machine code when the application successfully fulfills some type of criteria for jitting a method. The Java virtual machine then caches the native machine code for the method and reuses the code upon the next invocation of the method. Developers may also implement the execution engine in hardware and by embedding the execution engine on a chip so that the execution engine may execute the Java bytecodes natively. Java virtual machines usually interpret bytecodes, but Java virtual machines may also use other techniques, such as just-in-time compiling mentioned above, to execute bytecodes.

Figure 3:
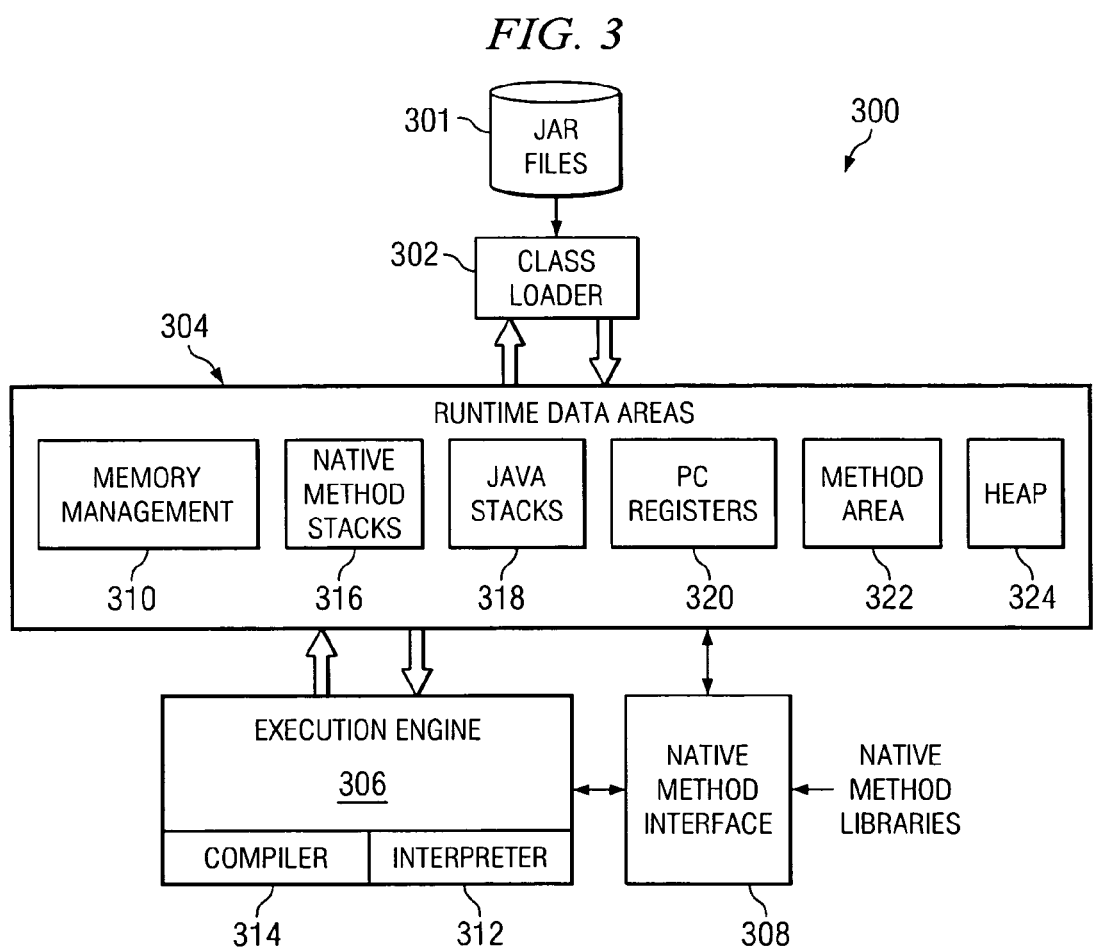
FIG. 3 shows a block diagram of a Java virtual machine (JVM) in accordance with an illustrative embodiment of the present invention.

With reference now to FIG. 3, this figure depicts a block diagram of a Java virtual machine in accordance with a preferred embodiment of the present invention. Java virtual machine 300 includes class loader 302, which is a mechanism for loading types, such as classes and interfaces, given fully qualified names. Classes may be located in a Java archive file (JAR), for example, Java archive file 301. Java virtual machine 300 also contains runtime data areas 304, execution engine 306, native method interface 308, and memory management 310. Execution engine 306 is a mechanism for executing instructions contained in the methods of classes loaded by class loader 302. Java interpreter 312 or just-in-time compiler 314 are examples of the execution engine 306. Native method interface 308 allows access to resources in the underlying operating system. Java native interface (JNI) is an example of native method interface 308. Runtime data areas 304 contain native method stacks 316, Java stacks 318, PC registers 320, method area 322, and heap 324. These different data areas represent the organization of memory needed by Java virtual machine 300 to execute a program.

Java stacks 318 store the state of Java method invocations. When the Java virtual machine launches a new thread, the Java virtual machine creates a new Java stack for the thread. In these examples, the Java virtual machine performs only two operations directly on Java stacks: the Java virtual machine pushes and pops frames. A thread's Java stack stores the state of Java method invocations for the thread. The state of a Java method invocation includes its local variables, the parameters with which a thread invoked the method, an associated return value, if any, and intermediate calculations. Java stacks comprise stack frames. A stack frame contains the state of a single Java method invocation. When a thread invokes a method, the Java virtual machine pushes a new frame onto the Java stack of the thread. When the method completes, the Java virtual machine pops the frame for that method and discards the frame. The Java virtual machine does not have any registers for holding intermediate values; any Java instruction that requires or produces an intermediate value uses the stack for holding the intermediate values. In this manner, the developers have suitably designed the Java instruction set for a variety of platform architectures.

Developers use program counter (PC) registers 320 to indicate the next instruction a thread executes. Each instantiated thread gets an associated PC register and Java stack. If the thread is executing a Java virtual machine method, the value of the PC register indicates the next instruction to execute. If the thread is executing a native method, then the contents of the PC register are undefined. Native method stacks 316 stores the state of invocations of native methods. Native method stacks, registers, or other implementation dependent memory areas store the state of native method invocations in an implementation-dependent way. Some Java virtual machine implementations combine the native method stacks 316 and Java stacks 318.

Method area 322 contains class data while heap 324 contains all instantiated objects. These examples show the constant pool located in method area 322. The Java virtual machine specification strictly defines data types and operations. Most Java virtual machines establish one method area and one heap, and all the threads running inside the Java virtual machine, such as Java virtual machine 300, share the method area and the heap. When Java virtual machine 300 loads a class file, the Java virtual machine parses information about a type from the binary data contained in the class file. Java virtual machine 300 places this type of information into the method area. Each time the Java virtual machine creates a class instance or array, it allocates the memory for the new object from heap 324. An instance is an object of a particular class. In programs written in the Java programming language, an instance of a class is created using the "new" operator followed by the class name. An instance of an executable class is an executable function that is stored to memory or other storage in the form of machine instructions. An instance of an executable class includes the instructions plus any unchanging values used by the function.

In these illustrative examples, modified class data take the form of a set of modified bytecodes and optionally modified metadata. The set of modified bytecodes contains one or more modified bytecodes. In the depicted examples, the set of modified bytecodes and metadata are modified from a Sun class file. A Sun class file is a class file written according to the Sun Java specifications, including, for example, the class format validator, 0xCAFEBABE. Modified class data is class data that a virtual machine is capable of interpreting. More importantly, modified class data is class data that is tailored to the specific virtual machine in order to allow more efficient memory management and quicker execution. Such gains are possible in comparison to the particular virtual machine processing ordinary Sun class files. A virtual machine is, for example, Java virtual machine 300 of FIG. 3.

Modified class data may be pre-translated, since the data is already in a somewhat optimized form for the particular virtual machine. Modified class data is sometimes called an internal representation. An internal representation may be a static internal representation. A static internal representation is merely a set of modified class data and a set of values. The set of values may be one or more values in these examples. A dynamic internal representation is an allocation in a memory to at least one data structure that may vary during operation of the static internal representation. The memory may be, for example, main memory 104 of FIG. 1.

Thus, a static internal representation may have a dynamic internal representation. In that case, the combined static internal representation and the dynamic internal representation are together also a modified class data. A set of values contains one or more values. In these examples, the set of values may include a single constant defined for use in the static internal representation. A value is a number that is stored without changing during the operation of executable code. A value may be for example, a known constant such as pi, which a developer may approximate with 3.14159.

Java virtual machine 300 includes an instruction that allocates memory space within the memory for heap 324 but includes no instruction for freeing that space within the memory. Memory management 310, in the depicted example, manages memory space within the memory allocated to heap 324. Memory management 310 may include a garbage collector, which automatically reclaims memory used by objects that are no longer referenced. Additionally, a garbage collector also may move objects to reduce heap fragmentation.

Figure 4:
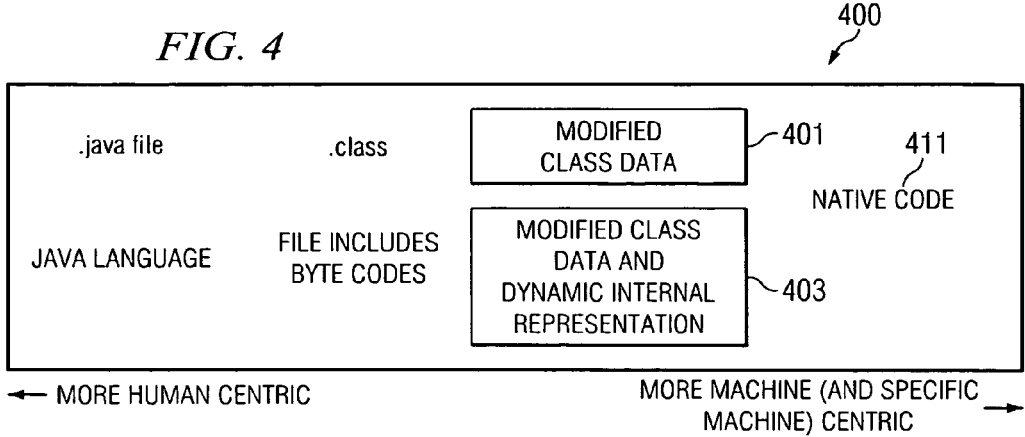
FIG. 4 shows a spectrum of abstract code representations in accordance with an illustrative embodiment of the present invention.

FIG. 4 shows an abstract spectrum 400 of program representation in accordance with an illustrative embodiment of the present invention. On the left of the spectrum, are representations that are best suited to human use, including Java language. On the right of the spectrum is native code 411 suited for a microprocessor and often a particular microprocessor type. One or more embodiments of the invention store and retrieve pre-translated files. These types of files also referred to as modified class data. A modified class data is an internal format of a class file suited to operate on a specific Java virtual machine. A set of modified class data is comprised of a set of modified bytecodes or a modified metadata. The set of modified bytecodes may be one or more bytecodes and the modified metadata may be, for example, modified class data 401. A set of modified class data also includes files that are modified class data and a dynamic internal representation 403.

Illustrative embodiments of the present invention include a Java virtual machine that may flexibly read input files that contain both Java executable resource files and locators that reference Java executable resource files. The illustrative embodiments of the present invention use archive files that include class proxy files that have a distinctive pattern to signal to the Java virtual machine that the file is a class proxy file. A distinctive pattern indicates a presence of a set of modified class data and a set of values. A class proxy file is a file that does not actually contain the details of a class file, but rather contains a locator used to find a class file elsewhere. A Java virtual machine loads class files and executes the bytecodes within the class files. A class loader loads the class files. The class loader loads class files from an application and the class files from the Java application programming interfaces (APIs) which an application may need. In particular, the class loader skips a translating step when internal representations are available. The execution engine that executes the bytecodes may vary across platforms and implementations.

Figure 5:
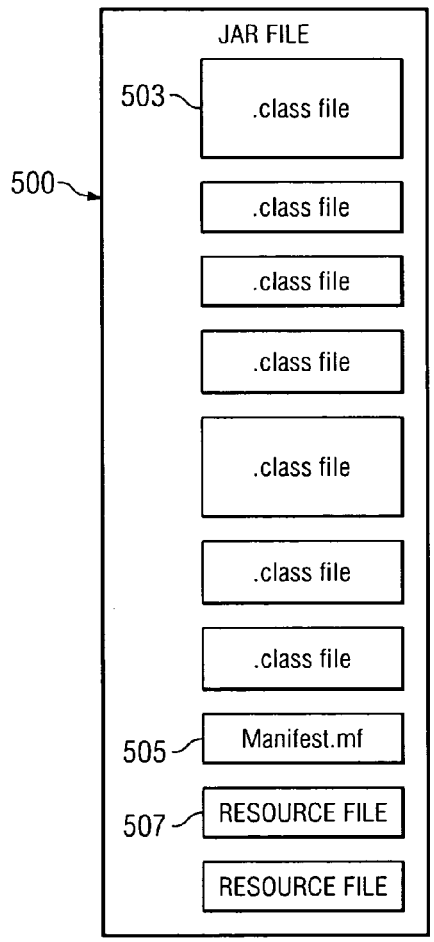
FIG. 5 shows a Java archive file as commonly made and used in accordance with an illustrative embodiment of the present invention.

FIG. 5 shows a known Java archive file or JAR that is commonly made and used. A Java archive file is an example of an archive file. An archive file is a collection of files that may be compressed into a common file, for example, a Java archive file. A Java archive file contains class files and may include auxiliary resources associated with applets and applications. Java archive file 500 contains a collection of regular class files, for example, class file 503. In addition, Java archive file 500 includes optional manifest file 505, and zero or more resource files, for example, resource file 507. A class file is a set of instructions written in an architecture independent language, such as Java. The class file has a class name. A class name is a name for a file that includes a suffix commonly used to identify an object class file, for example, ".class" as used for an object class file using the Java language. It will be appreciated that other suffixes may be widely accepted by industry to identify class files or other architecture independent languages. In addition to architecture independent code, class file 503 includes a class format validator. A class format validator is a distinctive pattern adopted by a group of developers to designate that a file is a class file. The class format validator is at a location in the file, for example, a known offset from the beginning of a file. For example, developers of Java class files, locate the class format validator, 0xCAFEBABE, at a zero offset from the beginning of class file 503.

Figure 6:
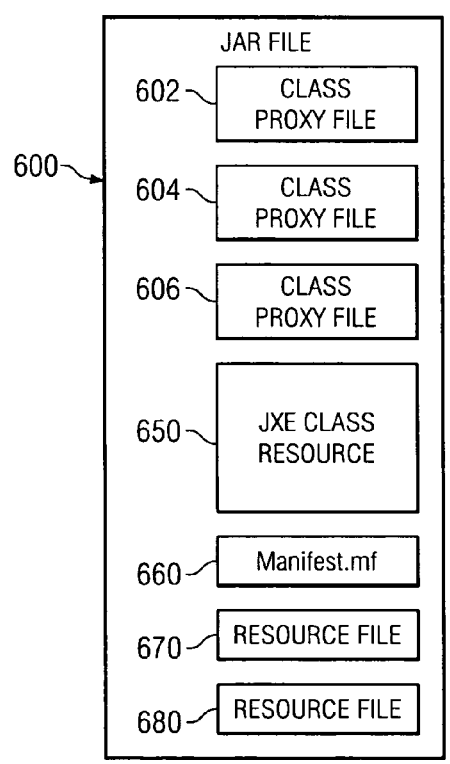
FIG. 6 shows a first embodiment of Java archive file in accordance with an illustrative embodiment of the present invention.

FIG. 6 shows an example of a Java archive file in accordance with an illustrative embodiment of the present invention. Java archive file 600 includes a class proxy file 602, second class proxy file 604, third class proxy file 606, Java executable class resource 650, manifest file 660, resource file 670, and second resource file 680. Java executable class resource 650 may include modified bytecodes known as a Java executable or JXE, as used in the IBM J9 Java Virtual Machine available from International Business Machines Corporation. Java executable class resource 650 contains at least one executable file in these examples. An executable file may contain a set of modified class data. The modified class data may be a static J9 internal representation of a class file that does not require translation into the J9 internal format. Like the class file of FIG. 5, Java archive file 600 may include manifest 660 in the same manner as Java archive file 500 of FIG. 5. In addition, Java archive file 600 may include resource file 670 similar to resource file 507 in FIG. 5. Executable class resource 650 includes modified class data. A set of modified class data includes a set of bytecodes modified from an architecture independent language to be efficiently executable on a particular Java virtual machine hosted on a particular architecture.

Figure 7:
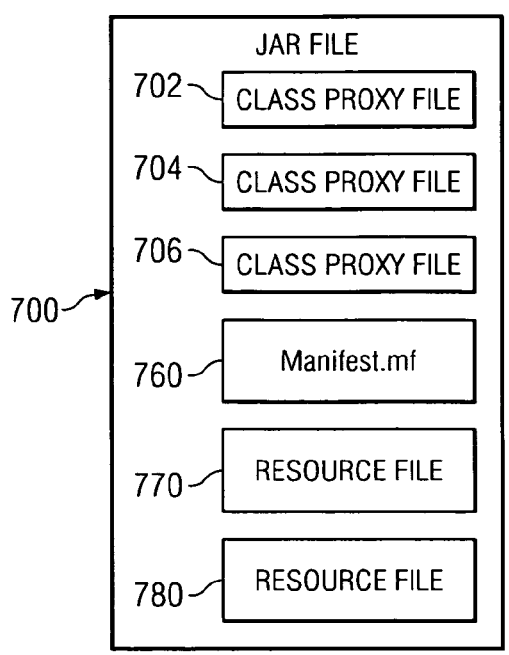
FIG. 7 shows a second embodiment Java archive file in accordance with an illustrative embodiment of the present invention.

FIG. 7 shows an example of another Java archive file in accordance with an illustrative embodiment of the present invention. In this other illustrative embodiment, Java archive file 700 includes first class proxy file 702, second class proxy file 704, and third class proxy file 706. Fewer or more than three class proxy files may be included within a Java archive file. Java archive file 700 includes manifest 760, first resource file 770, and second resource file 780. In this example, the distinction between FIG. 7 and FIG. 6 is that Java archive file 700 does not include executable class resource file, but rather may refer to an external executable file. The executable file is external in reference to the archive of files. Executable files are described in more detail in FIG. 9.

Figure 8:
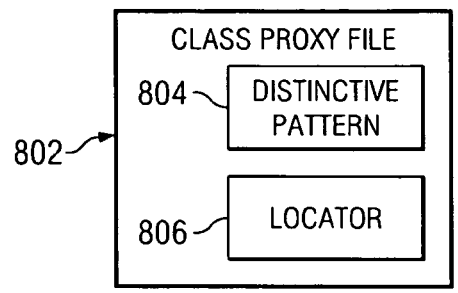
FIG. 8 shows a detailed collection of parts to a Java archive file in accordance with an illustrative embodiment of the present invention.

FIG. 8 shows the detailed makeup of a class proxy file in accordance with an illustrative embodiment of the present invention. Class proxy file 802 includes distinctive pattern 804 and locator 806. A distinctive pattern is a distinctive pattern in a digital file at a location, for example, a known offset from the beginning or end of the file. The distinctive pattern indicates a presence of a set of values and a set of modified class data. The distinctive pattern is a reasonably long pattern of data such that it would be unlikely for another file type to have the same pattern. By "unlikely", it is meant that a developer who creates or instructs a machine to create a file would not use the pattern without an intention that the file be later used by a Java virtual machine and is either an executable class resource or a class proxy file. An example of a distinctive pattern is 0x4A39524F4D434C415353434F4F4B4945. A distinctive pattern may be generated by a developer using a random number generator for subsequent use. A locator is a reference to an executable class resource that may reference an offset into an archive file as the location of the executable class resource. Alternatively, the locator may reference using, for example, a string, a path to a file that is an executable class resource.

Figure 9:
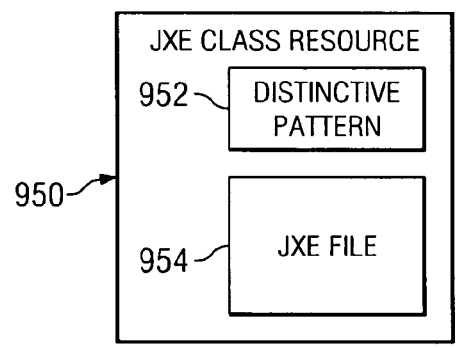
FIG. 9 shows a Java executable class resource that is referenced in accordance with an illustrative embodiment of the present invention.

FIG. 9 shows an executable class resource that may be, for example, executable class resource 650 of FIG. 6 in accordance with an illustrative embodiment of the present invention. In addition, executable class resource 950 may reside externally to a Java archive file in accordance with an illustrative embodiment of the present invention. An executable class resource file is a file that includes executable file 954 and distinctive pattern 952. Java executable file 954 may have a name that includes a ".class" suffix or other file suffixes associated with architecture independent language files. Executable class resource file 950 may be stored to a default path, commonly used as a storage space for an object class file on a Java virtual machine. Distinctive pattern 952 may be, for example, 0x4A39524F4D434C415353434F4F4B4945. It is appreciated that other distinctive patterns may be used and adopted by a group of developers to indicate that the executable class resource is an executable class resource. Executable file 954 is an archive that contains a set of modified class data. The set of modified class data may include one or more class data. As described above, modified class data includes a set of modified bytecodes and a set of values. The archive may include a table of contents and may employ compression and other methods to manage the size of the archive and organize the contents.

To better access executable file 954, a Java virtual machine may have a path or paths established in a configuration file such that the Java virtual machine searches among such paths for class files and executable class resources. To avoid ambiguity when loading and processing such files, a developer may establish executable file 954 with a unique name as related to other files stored among the paths.

Figure 10:
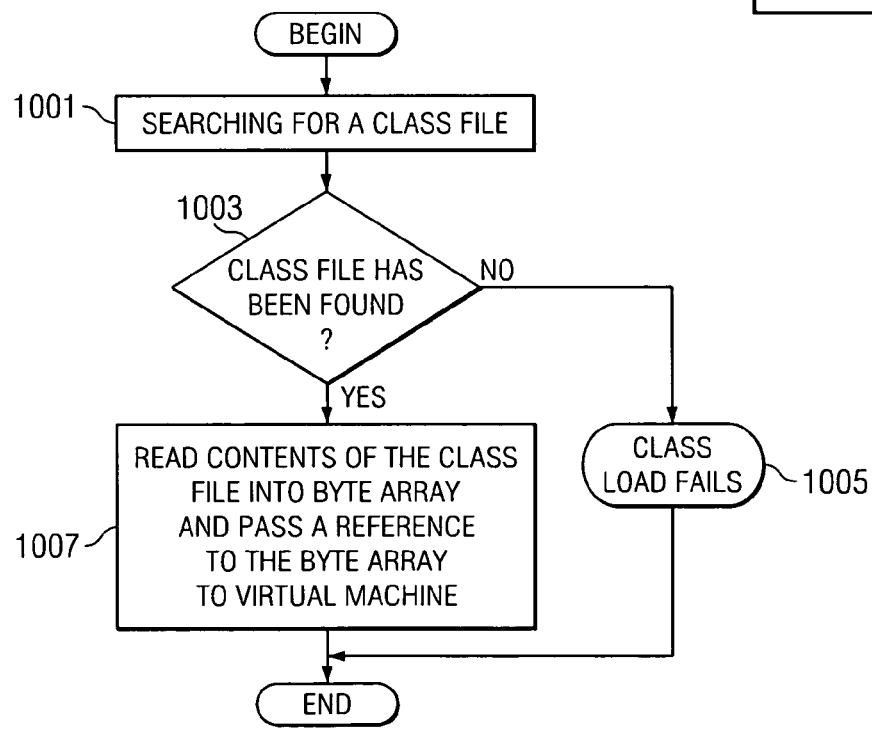
FIG. 10 shows a flowchart of a class loading process in accordance with an illustrative embodiment of the present invention.

FIG. 10 shows a flowchart of a class loading process in accordance with an illustrative embodiment of the present of invention. An illustrative embodiment of the present invention performs the steps of FIG. 10. For example, a class loader such as class loader 302 of FIG. 3 may perform the steps depicted in FIG. 10. An application may create a class loader. The virtual machine or the application may call the class loader to load a class. The class loader typically starts by searching for a class file (step 1001). The search may include converting all period characters in a class name to the directory separator character of the operating system. For each filename so modified, the class loader appends ".class" to the end of the name. A class file may be located in a directory in a file system according to a configuration file associated with the class loader. In addition, the class file may be in a Java archive file, for example, Java archive file 500 of FIG. 5.

The class loader determines whether the class file has been found (step 1003). A negative determination may result in the class loader reporting a failure (step 1005) with the process terminating thereafter. A positive determination results in the class loader reading the contents of the class file into a byte array and passing a reference to the byte array to a function, for example, defineClass( ) (step 1007) with the process terminating thereafter. A Java specified application programming interface is a program that defines how to create a class from a sequence of bytes. This step includes reading individual class proxy files, each having a ".class" suffix.

Figure 11:
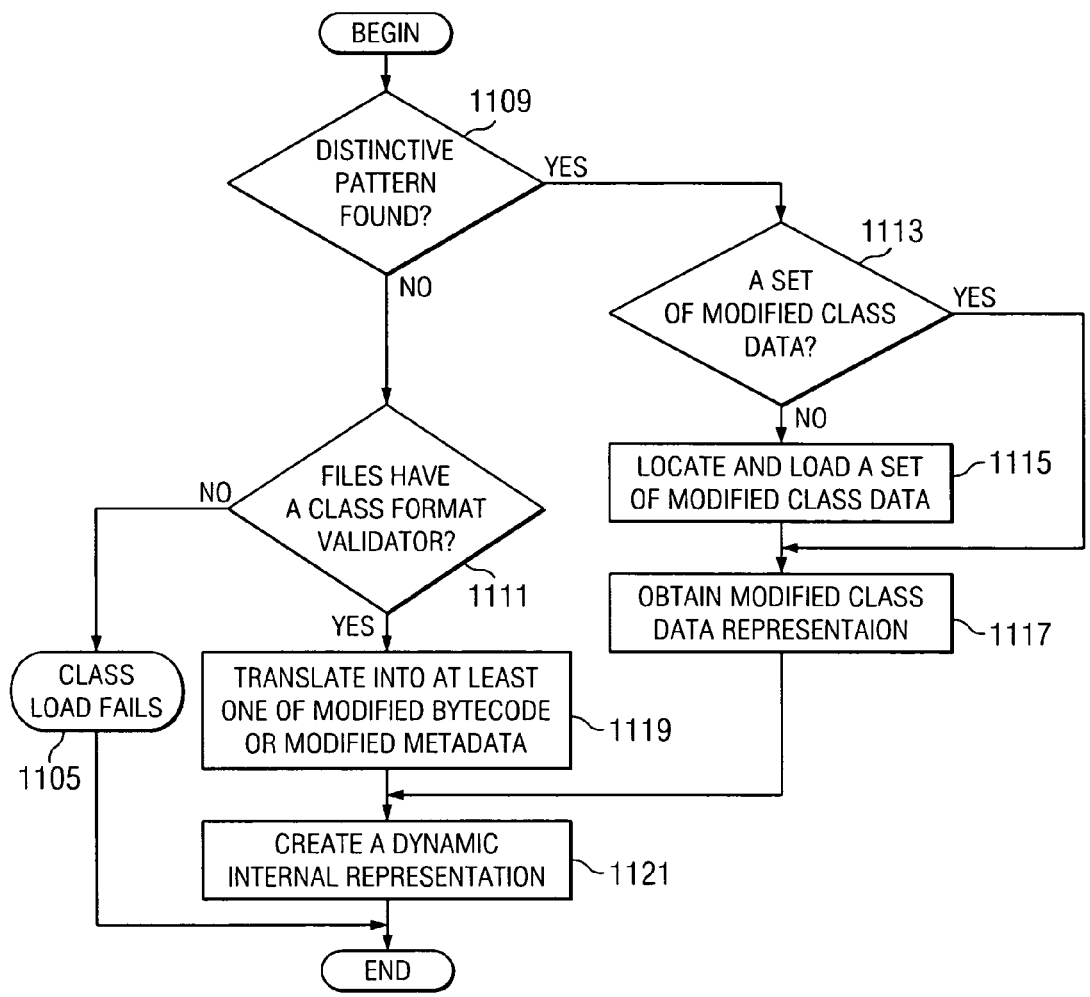
FIG. 11 shows a flowchart of a virtual machine loading modified class data in accordance with an illustrative embodiment of the present invention.

FIG. 11 shows a flowchart of a virtual machine loading asset of modified class data in accordance with an illustrative embodiment of the present invention. Function defineClass( ) is operating as a part of a virtual machine. Virtual machine may be Java virtual machine 204 of FIG. 2. Virtual machine receives a file loaded by class loader, for example, archive file 600 of FIG. 6. Virtual machine determines if a distinctive pattern is present in at least one expected place of each file having a class name, including the class proxy files (step 1109).

If virtual machine finds no class proxy files, as occurs when step 1109 is negative, virtual machine behaves like a conventional class loader. Virtual machine further checks to determine if any files have a class format validator, for example, 0xCAFEBABE (step 1111). The class validator, if 0xCAFEBABE, is known as the magic number for Sun class files and indicates that the file contains class files. Sun is a trademark of Sun Microsystems, Incorporated. If any necessary file lacks the validator, the virtual machine performs step 1105. Otherwise, virtual machine creates an internal representation of the class file as an object in the data processor, for example, data processing system 100 of FIG. 1.

The virtual machine may create an internal representation in two steps, as may occur in an IBM J9 Java Virtual Machine. First, the virtual machine may translate the class file into at least one of modified bytecode or modified metadata (step 1119). Second, the virtual machine may create a dynamic internal representation and establish access instructions for later use by virtual machine (step 1121). Dynamic internal representation type of class is a defined set of data structures that allocate space for each variable that the instantiated object may use, for example, counters, indexes and other variables that are used to temporarily store information. Such variables are set aside from other objects or classes to maintain better data integrity. Java stacks 318 of FIG. 3 are a kind of dynamic internal representation type. It is appreciated that other virtual machines may be built that perform translating step 1119 and creating step 1121 as one step and still remain within the scope of the invention.

The virtual machine determines if a set of modified class data is loaded into the virtual machine (step 1113), in response to a positive determination from step 1109. A positive determination from step 1113 causes virtual machine to obtain a modified class data representation of the class (step 1117). Obtaining includes looking up an offset into memory to find a beginning part to the modified bytecodes and a set of values, wherein the modified bytecodes and set of values may comprise an internal representation. Obtaining includes providing a virtual machine access to the modified class data representation and the set of values. The virtual machine then creates a dynamic internal representation for use by the modified class data during operation of modified class data (step 1121). It is appreciated that although the present illustrative embodiment of the invention obtains a modified class data of the class, other embodiments may obtain other internal representations.

The virtual machine may handle a negative determination at step 1113 in two or more ways, depending on which form the Java archive file takes among the exemplary forms shown in FIG. 6 and FIG. 7. Generally, the ways can be among the steps performed when the virtual machine locates and loads a set of modified class data (step 1115).

One mechanism for handling a negative determination at step 1113 involves the virtual machine reading a class proxy file, for example, class proxy file 602 of FIG. 6. The Java archive file has a Java executable class resource 650 that includes a modified class data for at least one class proxy file in Java archive file 600. Class proxy file 602 includes a locator that points to an offset within executable class resource 650 or an offset within the archive file. The offset represents the beginning of a modified class data corresponding to class proxy file 602. Thus, the virtual machine or class loader reads the locator from class proxy file 602. In addition, virtual machine loads the modified class data by looking up the modified class data based on the locator. Looking up may include opening the class proxy file 602.

A second way at step 1115 to locate a set of modified class data involves virtual machine reading a class proxy file, for example, class proxy file 702 of FIG. 7. Java archive file 700 may lack an executable class resource. Instead, each class proxy file may have a locator that names an external file with a file path. The file path, in this case, may include a file name. The file path may be a path that references a directory within a file system of a data processor, for example data processor 100 of FIG. 1. In the latter case, the virtual machine finds a file that is located on a file system in the file path and uses a default file name. The file system may be, for example, located on hard disk drive 126 of FIG. 1. Illustrative embodiments of the present invention organize such executable file 954 as shown in FIG. 9.

Figure 12:
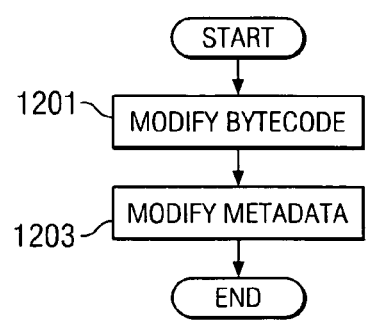
FIG. 12 shows a flowchart of a virtual machine translating aspects of a class file in accordance with an illustrative embodiment of the present invention.

FIG. 12 shows a flowchart of a virtual machine translating aspects of a class file in accordance with an illustrative embodiment of the present invention. Steps shown in this figure show, with specificity, one or more steps that occur within step 1119 in FIG. 11. Embodiments of the present invention perform step 1119 when such embodiments discover that no pre-translated file exists. For example, a J9 Java virtual machine may operate better if J9 replaces certain bytecodes of a Sun class file. Thus, virtual machine may modify bytecodes (step 1201). One instance where a J9 java virtual machine may modify bytecodes is to replace Sun class bytecodes associated with a Java language 'return', also known as return bytecodes. Judging by the context of the 'return' bytecodes, the J9 Java virtual machine will substitute in at least one modified bytecode to form a modified class data. Such modified bytecode or bytecodes help the J9 Java virtual machine operate more efficiently whenever such modified bytecodes are compiled and executed.

Java virtual machine may also modify metadata (step 1203). For example, a virtual machine may compress metadata. More specifically, a class file may have many strings that include 'Java.lang.Object'. Such strings, if stored internally in full form, cause excessive use of memory. Consequently, the J9 Java virtual machine may replace each occurrence of 'Java.lang.Object' with an offset into memory where a single representation of 'Java.lang.Object' is located. It is appreciated that many other forms of data compression and re-organization may be performed and remain within the scope of this step.

Upon concluding step 1203, virtual machine will have created a modified class data. Operation of the embodiment of the present invention that takes the affirmative path in FIG. 11 step 1109, provides access to modified class data that is contained within the file loaded earlier. Therefore, an affirmative path from step 1109 permits skipping the lengthy steps of FIG. 12.

A developer may hand edit, or use an authoring tool to make an executable class resource, such as, for example, Java executable class resource 650 of FIG. 6. The authoring tool stores a distinctive pattern to a file, such that the file has a class name. The authoring tool stores a modified class data to the file to form the executable class resource. In addition, the authoring tool may place the file in an archive file, for example, Java archive file 600 of FIG. 6. Placing means that the tool may compress the file and add metadata to the archive file or other data structure to sort and locate the file later. The authoring tool may add a class proxy file, for example, class proxy file 602 of FIG. 6. Class proxy file 602 has a locator that references the modified class data.

Thus, a virtual machine according to the illustrative embodiments of the present invention may shorten a process of processing class files by detecting the presence of internal representations. Once such internal representations are found, a time consuming step of translating is avoided. Consequently, a user may find a data processing system more responsive.

Although a Java virtual machine has been shown in one or more illustrative embodiments of the present invention, it is appreciated that the invention encompasses any kind or class of virtual machine.

The invention can take the form of an entirely hardware embodiment, an entirely software embodiment or an embodiment containing both hardware and software elements. In a preferred embodiment, a developer would implement the invention in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories. Such memory elements provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters coupled to the system enable the data processing system to couple to other data processing systems or remote printers or storage devices through intervening private or public networks. Modems, cable modems and Ethernet cards are just a few of the currently available types of network adapters.

The inventors present this description of the present invention for purposes of illustration and description, and do not intend it to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing files in a virtual machine in a data processing system that includes a processor, the computer implemented method comprising:
    receiving an archive file, which does not include class files, during a class loading process;
    searching, by the virtual machine that is being executed by the processor, the archive file to determine if the archive file contains a particular file that includes a distinctive pattern, wherein the distinctive pattern indicates that the particular file is a class proxy file, wherein the class proxy file includes a locator that points to a location that includes a set of modified class data, and further wherein the set of modified class data includes a set of bytecodes that have been modified from an architected independent language to be executable on the particular virtual machine hosted on the processor that is a particular architecture, and still further wherein the class proxy file does not include a class file; and
    responsive to locating the particular file, the class proxy file, and the locator, providing the virtual machine access to the set of modified class data.

2. The computer implemented method of claim 1 further comprising:
    responsive to a determination that the archive file does not contain a distinctive pattern, determining if the archive file contains a class format validator indicating a presence of a particular class file; and
    responsive to a determination that the archive file contains the class format validator, translating the particular class file into a second set of modified class data and a second set of values.

3. The computer implemented method of claim 1 wherein the set of modified class data comprises a set of modified bytecodes and a modified metadata.

4. The method according to claim 1, further comprising:
    including, in the archive file, a plurality of different class proxy files, wherein the plurality of different class proxy files includes the class proxy file; and
    searching each one of the plurality of different class proxy files to determine whether a particular distinctive pattern is located in one of the plurality of different class proxy files.

5. The method according to claim 1, wherein providing the virtual machine access to the set of modified class data further comprises obtaining the set of modified class data, and further wherein the set of modified class data and a set of values is a static internal representation.

6. The method according to claim 5, further comprising:
    creating a dynamic internal representation using the set of modified class data is used, wherein translation of class files is skipped during the class loading process.

7. The method according to claim 1 wherein the distinctive pattern is a file identifier that is stored in a particular location in the class proxy file.

8. The method according to claim 1, wherein the locator is a data file name that identifies a data file in which the modified class data is stored, and further wherein the data file is stored in a file system and is not stored in the archive file.

9. A computer program product that is stored in a non-transitory computer readable medium, the computer program product comprising:
    computer usable program code for processing files in a virtual machine;
    computer usable program code for receiving an archive file, which does not include class files, during a class loading process;
    computer usable program code for searching the archive file to determine if the archive file contains a particular file that includes a distinctive pattern, wherein the distinctive pattern indicates that the particular file is a class proxy file, wherein the class proxy file includes a locator that points to a location that includes a set of modified class data, and further wherein the set of modified class data includes a set of bytecodes that have been modified from an architected independent language to be executable on a particular Java virtual machine hosted on a particular architecture, and still further wherein the class proxy file does not include a class file; and computer usable program code for, responsive to locating the particular file, the class proxy file, and the locator, providing the virtual machine access to the set of modified class data.

10. The computer program product of claim 9 further comprising:

computer usable program code for, responsive to a determination that the archive file does not contain a distinctive pattern, determining if the archive file contains a class format validator indicating a presence of a particular class file; and computer usable program code for, responsive to a determination that the archive file contains a class format validator, translating the particular class file into a second set of modified class data.

11. The computer program product of claim 9 wherein the set of modified class data comprises a set of modified bytecodes and a modified metadata.

12. The computer program product of claim 9, further comprising:

computer usable program code for including, in the archive file, a plurality of different class proxy files, wherein the plurality of different class proxy files includes the class proxy file; and computer usable program code for searching each one of the plurality of different class proxy files to determine whether a particular distinctive pattern is located in one of the plurality of different class proxy files.

13. The computer program product of claim 9, wherein the computer usable program code for providing the virtual machine access to the set of modified class data further comprises computer usable program code for obtaining the set of modified class data, and further wherein the set of modified class data and a set of values is a static internal representation.

14. The computer program product of claim 13, further comprising:

computer usable program code for creating a dynamic internal representation using the set of modified class data is used, wherein translation of class files is skipped during the class loading process.

15. The computer program product of claim 9, wherein the distinctive pattern is a file identifier that is stored in a particular location in the class proxy file.

16. The computer program product of claim 9, wherein the locator is a data file name that identifies a data file in which the modified class data is stored, and further wherein the data file is stored in a file system and is not stored in the archive file.

* * * * *